No. 706,972. Patented Aug. 12, 1902.
E. LUHMANN.
APPARATUS FOR THE PRODUCTION OF PURE CARBONIC ACID GAS FROM CARBONATES IN A CONTINUOUS MANNER.
(Application filed Nov. 18, 1901.)
(No Model.)
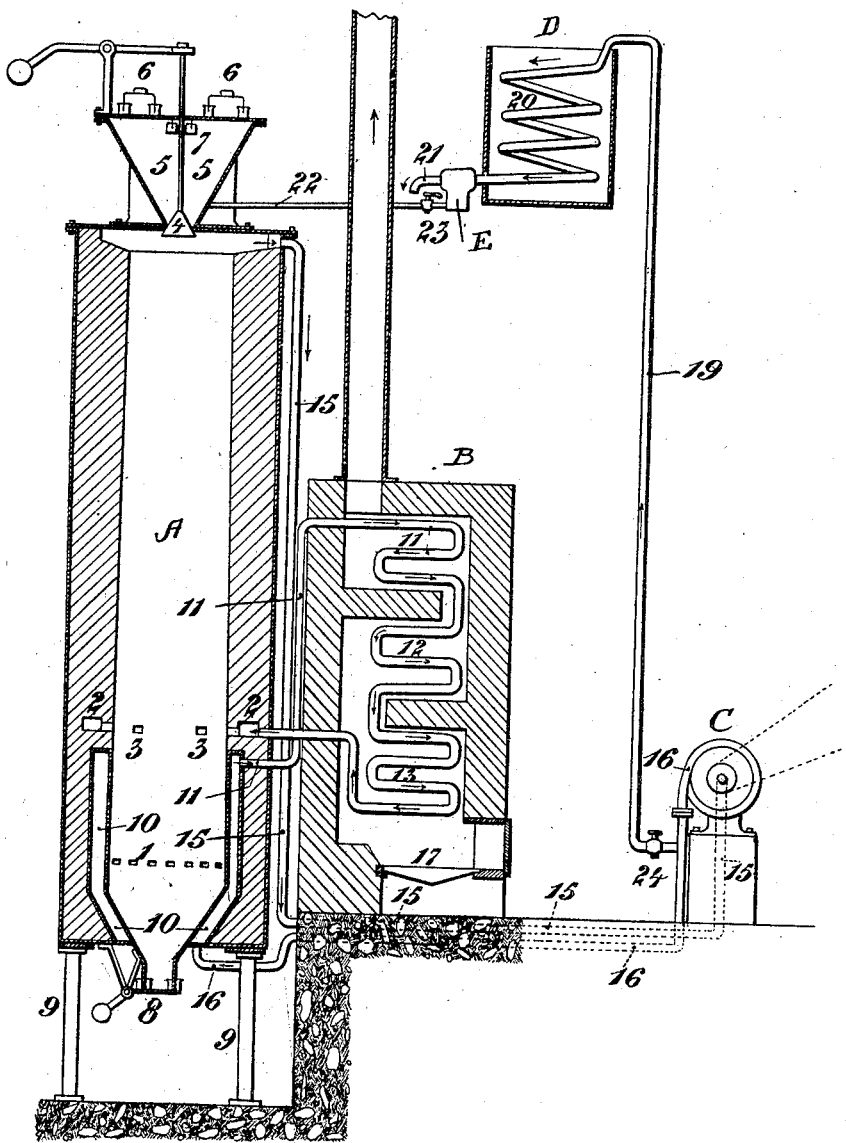

UNITED STATES PATENT OFFICE.

EDUARD LUHMANN, OF MÜNSTER, GERMANY.

APPARATUS FOR THE PRODUCTION OF PURE CARBONIC-ACID GAS FROM CARBONATES IN A CONTINUOUS MANNER.

SPECIFICATION forming part of Letters Patent No. 706,972, dated August 12, 1902.

Application filed November 18, 1901. Serial No. 82,735. (No model.)

*To all whom it may concern:*

Be it known that I, EDUARD LUHMANN, a subject of the King of Prussia, German Emperor, residing at Münster, Westphalia, in the Kingdom of Prussia, German Empire, have invented certain new and useful Improvements in Methods of and Apparatus for the Production of Pure Carbonic-Acid Gas from Carbonates in a Continuous Manner, of which the following is a specification.

My invention relates to apparatus for the production of pure carbonic-acid gas from carbonates in a continuous manner.

The elimination of carbonic-acid gas from carbonates of alkaline earths by high heat has up to the present been effected by the material being hermetically inclosed in retorts or similar receptacles and brought into a glowing condition by means of heat applied upon the outside of the retort. It has also been proposed to utilize, for the purpose of transmitting the heat, a portion of the carbonic-acid gas driven off from the carbonate in such a manner that this gas is alternately conducted through a chamber filled with bricks in the form of lattice or open work, which chamber has previously been brought to a red heat by gas or other suitable means, whereupon the carbonic-acid gas thus heated is conducted through the carbonate. These methods, however, cannot be efficiently carried out in practice, as their working is periodical and in consequence of the great consumption in fuel and raw material uneconomical. Retorts made of metal are unable to withstand the great heat necessary for the elimination of the carbonic-acid gas and are destroyed in a very short time. The gas drawn from the carbonate-receiver and first of all conducted through regenerator-chambers cannot be brought to the necessary incandescence, as the chamber is itself only heated to this degree, so that the gas passing through cannot of course attain the heat of the retort and much less transmit it. The greatest drawback in all cases, however, is that the carbonic-acid gas is never obtained free from air. The carbonic acid to a great extent is contaminated with nitrogen gas in the regenerator-chambers by mixing with the products of combustion, which after each heating remain in the regenerating-chambers.

By means of the apparatus hereinafter described pure carbonic-acid gas perfectly free from air can be obtained with continuous working and with a very economical consumption of material.

The accompanying drawing is a vertical sectional view of my improved apparatus.

A is a shaft-furnace having a lining of fire-proof bricks or other material within a tight iron casing. The inner space of this shaft-furnace, which tapers, is specially adapted to receive the crushed carbonate in small pieces. The charge rests upon a grate 1, the hollow bars of which, cooled by means of water, are tightened externally by means of stuffing-boxes. The charge is effected under hermetic closure by means of a feeding-funnel, the air in the spaces between the crushed carbonate being previously driven out by carbonic-acid gas, or it is effected in any other known manner. The discharge of the treated carbonate is effected periodically after a preliminarily-effected raising of the pressure, so as to prevent the outer air from entering. In the meantime the gate 8 at the bottom of the shaft-furnace is hermetically closed. The shaft of the furnace A is provided at its lower part with a hollow jacket 10, of sheet-iron, which is adapted to effect the cooling of the heated carbonate by means of water or gas.

In the auxiliary furnace B, which is preferably heated by means of gas, is arranged a system of multiple coils 11 12 13 of any suitable material—such as porcelain, fire-clay, platinum, or the like—and which is connected, on the one hand, by the jacket 10 and pipes 15 16 with the upper part of the shaft-furnace A and terminates, on the other hand, through a channel 2 and openings 3 3 3 in the lower space of the shaft-furnace. Between the pipes 15 16 is arranged an aspirator or fan, with the object of continuously drawing off from the top of the shaft-furnace A the carbonic-acid gas at a temperature of about 200° in order to drive it through the conduit 16 into the jacket 10 and the heating-coil system 11 12 13 and through the channel 2 into the furnace A. The pipe 19, branching off from the connecting-pipe 16 and having an extension 21 leading to a gasometer, is shaped so as to form in the cooling apparatus D a coil 20 and has a water-separator E with a condensed-water pipe 22.

The process of removing the carbonic acid by means of the described apparatus is as follows: First of all the atmospheric air is driven out by introducing pure carbonic acid in its place in parts of the shaft-furnace A and in the coils in connection with it, whereupon the fan C or the like is set in operation and the gas for heating the auxiliary furnace B is ignited. Owing to the continual circulation of the gas in the shaft-furnace A and in the coils in connection therewith and in consequence of the heating of the pipes 11 12 13, so much heat is transmitted to the carbonate in the shaft-furnace that an incandescent zone is soon formed above the openings 3 3, in which zone the carbonic acid is driven out from the carbonate and carried off in an upward direction. The excess of gas thus produced is carried off through the conduit 19 21 to the gasometer, which is adapted to control the pressure in the whole apparatus. Attention is drawn to the fact that the gas continually transmitting the heat is heated in the coils from the outside, so as to prevent its contamination by the heating-gases, no fuel being fed to the shaft-furnace.

The mineral from which the carbonic-acid gas has been released by the heat is periodically or gradually brought downward by means of the rotatable grate 1 and removed from the shaft-furnace at 8. In accordance with the consumption means are provided for gradually charging the shaft-furnace so as to keep the latter filled. On the entrance of the fresh charge, which is preliminarily heated, the circulating gas becomes cooled to about 200°, being thus prevented from destroying the fan or gas-exhauster.

If the gas circulating in the heating-coils is a mixture of carbonic-acid gas and steam, the latter is condensed in the cooler D by condensing the gas passing to the gasometer, and the condensed water collected in E is again converted into steam in any convenient manner in order to be again incorporated with the circulating gas.

Having now particularly described and ascertained the nature of my said invention and in what manner the same is to be performed, I declare that what I claim is—

1. In an apparatus of the class described, the combination with a shaft-furnace for the reception of the carbonate to be treated and having a jacket circumferentially arranged in its lower part, of the auxiliary heating-furnace having a coil arranged therein, a fan, a pipe leading from the top of said furnace to said fan, a pipe leading from the fan to one end of the jacket, a branch pipe leading from said last-named pipe for withdrawing gas from the apparatus, a pipe leading from the other end of the jacket to the coil, and a pipe leading from the other end of the coil to the lower part of the furnace, substantially as described.

2. In an apparatus of the class described, the combination with a shaft-furnace for the reception of the carbonate to be treated, of an auxiliary heating-furnace having a coil arranged therein, a fan, a pipe leading from the top of the shaft-furnace to said fan, a jacket circumferentially arranged in the lower end of the shaft-furnace, a pipe leading from the fan to one end of the jacket, a pipe leading from the other end of the jacket to the coil, and a pipe leading from the other end of the coil to the lower part of the furnace, a condenser and a pipe arranged to withdraw a portion of the gas as it is discharged from the fan and lead it to the condenser, substantially as described.

3. In an apparatus of the class described, the combination with a furnace for the reception of the carbonate to be treated, of an auxiliary heating-furnace having a coil arranged therein, a fan, a pipe 15 leading from the top of the furnace to said fan, a pipe 16 leading from the fan to one end of the coil, a pipe leading from the other end of the coil to the lower part of the furnace, a condenser, a branch pipe leading from the pipe 16 to the condenser, a water-separator, and a pipe leading from the condenser to said separator and from the latter to convey the gas to its place of consumption or storage, substantially as described.

4. In an apparatus of the class described, the combination with a furnace for the reception of the carbonate to be treated and provided with an internal hollow jacket in its lower end, of an auxiliary heating-furnace having a coil arranged therein, a fan, a pipe leading from the top of the furnace to said fan, a pipe leading from the fan to said jacket and from said jacket to one end of the coil, a pipe leading from the other end of the coil to the lower part of the furnace, and a pipe for withdrawing a part of the gas as it is discharged from the fan, substantially as described.

In testimony whereof I have hereunto set my hand in presence of two subscribing witnesses.

EDUARD LUHMANN.

Witnesses:
 WOLDEMAR HAUPT,
 HENRY HASPER.